US012203359B2

(12) United States Patent
Robison et al.

(10) Patent No.: US 12,203,359 B2
(45) Date of Patent: Jan. 21, 2025

(54) PUMPING UNIT INSPECTION SENSOR ASSEMBLY, SYSTEM AND METHOD

(71) Applicant: WEATHERFORD TECHNOLOGY HOLDINGS, LLC, Houston, TX (US)

(72) Inventors: Clark E. Robison, Tomball, TX (US); Bryan A. Paulet, Spring, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 99 days.

(21) Appl. No.: 17/693,646

(22) Filed: Mar. 14, 2022

(65) Prior Publication Data

US 2022/0195863 A1 Jun. 23, 2022

Related U.S. Application Data

(63) Continuation of application No. 16/993,240, filed on Aug. 13, 2020, now Pat. No. 11,339,643.

(51) Int. Cl.
*E21B 47/008* (2012.01)
*G08B 21/18* (2006.01)

(52) U.S. Cl.
CPC .......... *E21B 47/008* (2020.05); *G08B 21/182* (2013.01)

(58) Field of Classification Search
CPC .... E21B 47/008; E21B 43/126; E21B 43/127; E21B 44/00; G08B 21/182
See application file for complete search history.

(56) References Cited

U.S. PATENT DOCUMENTS

| | | | |
|---|---|---|---|
| 4,490,094 | A | 12/1984 | Gibbs |
| 9,903,193 | B2 | 2/2018 | Harding et al. |
| 10,197,050 | B2 | 2/2019 | Robison et al. |
| 10,450,065 | B2 | 10/2019 | Buchmueller et al. |
| 2017/0298925 | A1 | 10/2017 | Singal et al. |
| 2017/0306745 | A1 | 10/2017 | Harding et al. |

(Continued)

FOREIGN PATENT DOCUMENTS

| | | | |
|---|---|---|---|
| WO | 2018190991 | A1 | 10/2018 |

OTHER PUBLICATIONS

Weatherford; "ForeSite Sense", company brochure No. 12949.00, dated 2019, 2 pages.

(Continued)

*Primary Examiner* — Mirza F Alam
(74) *Attorney, Agent, or Firm* — Smith IP Services, P.C.

(57) ABSTRACT

A sensor assembly can include a gyroscope, an accelerometer, and a housing assembly containing the gyroscope and the accelerometer. An axis of the gyroscope can be collinear with an axis of the accelerometer. A method of inspecting a well pumping unit can include attaching a sensor assembly to the pumping unit, recording acceleration versus time data, and in response to an amplitude of the acceleration versus time data exceeding a predetermined threshold, transforming the data to acceleration versus frequency data. A method of balancing a well pumping unit can include comparing peaks of acceleration versus rotational orientation data to peaks of acceleration due to circular motion, and adjusting a position of a counterweight, thereby reducing a difference between the peaks of acceleration due to circular motion and the peaks of the acceleration versus rotational orientation data for subsequent operation of the pumping unit.

10 Claims, 8 Drawing Sheets

(56) References Cited

U.S. PATENT DOCUMENTS

| | | | |
|---|---|---|---|
| 2018/0016889 | A1 | 1/2018 | McDonald et al. |
| 2018/0112521 | A1 | 4/2018 | Peco et al. |
| 2018/0128264 | A1 | 5/2018 | Robison et al. |
| 2018/0298744 | A1 | 10/2018 | Ebrahimi et al. |
| 2019/0012492 | A1 | 1/2019 | Pons et al. |
| 2019/0024497 | A1* | 1/2019 | Harding ................ E21B 47/008 |
| 2019/0203579 | A1 | 7/2019 | Phillips |
| 2020/0024787 | A1 | 1/2020 | Smith |
| 2020/0191136 | A1* | 6/2020 | Hoefel .................. F04B 49/065 |
| 2020/0263531 | A1* | 8/2020 | Fyfe ........................ F04B 51/00 |
| 2020/0392822 | A1* | 12/2020 | Sengul .................... F04B 47/02 |
| 2020/0392834 | A1* | 12/2020 | Sengul .................. E21B 47/009 |
| 2020/0393822 | A1* | 12/2020 | Davis ............... G05B 19/41865 |

OTHER PUBLICATIONS

Analog Devices, Inc.; "Improving Industrial Control with Integrated MEMS Inertial Sensors", dated 1995-2020, 3 pages.

Analog Devices, Inc.; "MEMS Inertial Measurement Units for Complex Motion Capture and Processing", comapny brochure No. BR11505-2, dated May 2013, 4 pages.

Analog Devices, Inc.; "The Five Motion Senses: Using MEMS Inertial Sensing Sensing to Transform Applications", company brochure No. T08189-0, dated Mar. 2017, 4 pages.

International Search Report and Written Opinion issued Jan. 4, 2022 for IA PCT/US2021/037295, 21 pages.

* cited by examiner

PUMPING UNIT INSPECTION SENSOR ASSEMBLY, SYSTEM AND METHOD

CROSS-REFERENCE TO RELATED APPLICATION

This application is a continuation of prior application Ser. No. 16/993,240 filed on 13 Aug. 2020. The entire disclosure of this prior application is incorporated herein by this reference.

BACKGROUND

This disclosure relates generally to equipment utilized and operations performed in conjunction with a subterranean well and, in examples described below, more particularly provides an inspection sensor assembly, system and method for use with a pumping unit.

Beam pumping units are sometimes referred to as pump-jacks or walking-beam pumping units. Typically, a beam pumping unit is balanced using counterweights that descend to convert potential energy to kinetic energy when a rod string connected to the pumping unit ascends to pump fluids from a well, and the counterweights ascend to convert kinetic energy to potential energy when the rod string descends in the well. Efficient operation of the pumping unit depends in large part on whether the counterweights effectively counterbalance loads imparted on the beam by the rod string.

Efficient operation of a pumping unit also depends on minimizing friction in operation of the pumping unit. In some cases, increased friction can result from wear or failure of components of the pumping unit. These components include, but are not limited to, bearings, gearboxes and other moving components of the pumping unit.

Therefore, it will be readily appreciated that improvements are continually needed in the arts of configuring beam pumping units for efficient operation and maintaining such efficient operation. The disclosure below provides such improvements to the arts, and the principles described herein can be applied advantageously to a variety of different pumping unit types and operational situations.

DETAILED DESCRIPTION

Figure 1:
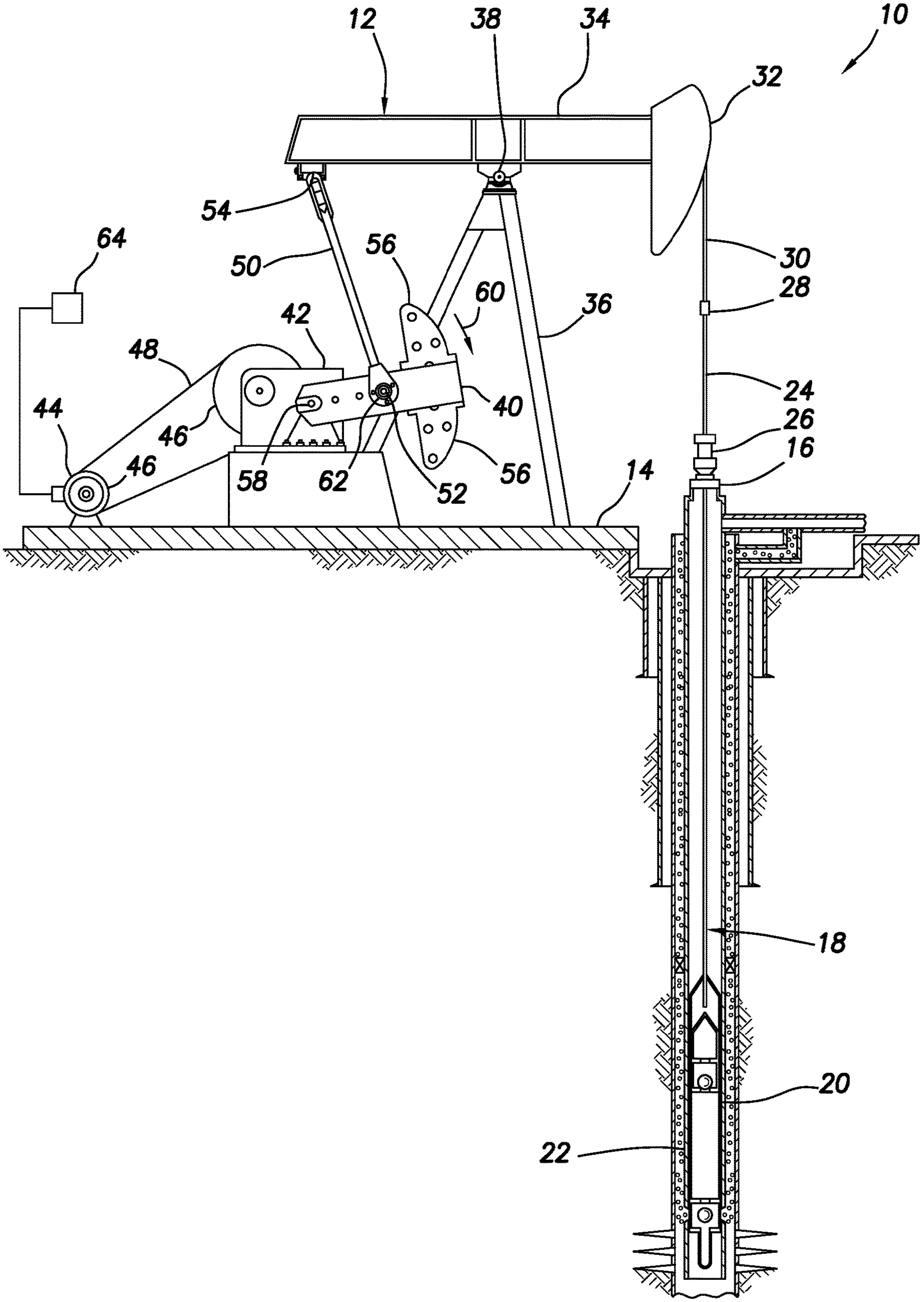
FIG. 1 is a representative partially cross-sectional view of an example of a well system and associated method which can embody principles of this disclosure.

Representatively illustrated in FIG. 1 is a system 10 and associated method for use with a subterranean well, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a walking beam-type surface pumping unit 12 is mounted on a pad 14 adjacent a wellhead 16. A rod string 18 extends into the well and is connected to a downhole pump 20 in a tubing string 22. Reciprocation of the rod string 18 by the pumping unit 12 causes the downhole pump 20 to pump fluids (such as, liquid hydrocarbons, gas, water, etc., and combinations thereof) from the well through the tubing string 22 to surface.

The pumping unit 12 as depicted in FIG. 1 is of the type known to those skilled in the art as a "conventional" pumping unit. However, the principles of this disclosure may be applied to other types of pumping units (such as, those known to persons skilled in the art as Mark II, reverse Mark, beam-balanced and end-of-beam pumping units). Thus, the scope of this disclosure is not limited to use of any particular type or configuration of pumping unit. For example, a hydraulic pumping unit (e.g., comprising a piston that reciprocates in a cylinder) may be used in other examples.

The rod string 18 may comprise a substantially continuous rod, or may be made up of multiple connected together rods (also known as "sucker rods"). At an upper end of the rod string 18, a polished rod 24 extends through a stuffing box 26 on the wellhead 16. An outer surface of the polished rod 24 is finely polished to avoid damage to seals in the stuffing box 26 as the polished rod reciprocates upward and downward through the seals.

A carrier bar 28 connects the polished rod 24 to a bridle 30. The bridle 30 typically comprises multiple cables that are secured to and wrap partially about an end of a horsehead 32 mounted to an end of a beam 34.

The beam 34 is pivotably mounted to a Samson post 36 at a saddle bearing 38. In this manner, as the beam 34 alternately pivots back and forth on the saddle bearing 38, the rod string 18 is forced (via the horsehead 32, bridle 30 and carrier bar 28) to alternately stroke upward and downward in the well, thereby operating the downhole pump 20.

The beam 34 is made to pivot back and forth on the saddle bearing 38 by means of crank arms 40 connected via a gear reducer 42 to a prime mover 44 (such as, an electric motor or a combustion engine). Typically, a crank arm 40 is connected to a crankshaft 58 of the gear reducer 42 on each lateral side of the gear reducer.

The gear reducer 42 converts a relatively high rotational speed and low torque output of the prime mover 44 into a relatively low rotational speed and high torque input to the crank arms 40 via the crankshaft 58. In the FIG. 1 example, the prime mover 44 is connected to the gear reducer 42 via sheaves 46 and belts 48.

The crank arms 40 are connected to the beam 34 via Pitman arms 50. The Pitman arms 50 are pivotably connected to the crank arms 40 by crankpins or wrist pins 52. The Pitman arms 50 are pivotably connected at or near an end of the beam 34 (opposite the horsehead 32) by tail or equalizer bearings 54.

It will be appreciated that the rod string 18 can be very heavy (typically weighing many thousands of pounds or kilos). In order to keep the prime mover 44 and gear reducer 42 from having to repeatedly lift the entire weight of the rod string 18 (and, additionally, any pumped fluids due to operation of the downhole pump 20, and overcoming friction), counterweights 56 are secured to the crank arm 40.

As depicted in FIG. 1, the gear reducer 42 rotates the crank arm 40 in a clockwise direction 60, and so the counterweights 56 assist in pulling the Pitman arms 50 (and the end of the beam 34 to which the Pitman arms are connected) downward, so that the rod string 18 is pulled upward. In this manner, the counterweights 56 at least partially "offset" the load applied to the beam 34 from the rod string 18 via the polished rod 24, carrier bar 28 and bridle 30.

As a matter of convention, a clockwise or counter-clockwise rotation of the crank arm 40 is judged from a perspective in which the horsehead 32 is positioned at a right-hand end of the beam 34 (as depicted in FIG. 1). The principles of this disclosure may be applied to pumping units having clockwise or counter-clockwise crank arm rotation.

For various reasons (such as, varying rod string 18 weights, varying well conditions, etc.), the counterweights 56 can be located at various positions along the crank arms 40. In this manner, a torque applied by the counterweights 56 to the crankshaft 58 via the crank arms 40 can be adjusted to efficiently counteract a torque applied by the rod string 18 load via the beam 34, Pitman arms 50 and crank arms 40.

Ideally, all torques applied to the crankshaft 58 via the crank arms 40 would sum to zero or "cancel out," so that the prime mover 44 and gear reducer 42 would merely have to overcome friction due to the reciprocating motion of the various components of the pumping unit 12 and rod string 18. The pumping unit 12 would (in that ideal situation) be completely "balanced," and minimal energy would need to be input via the prime mover 44 to pump fluids from the well.

The principles described below can be used to achieve partial or complete balancing of the pumping unit 12. In some examples, this balancing is achieved by determining positions of the counterweights 56 that will result in a normalized acceleration of the crankshaft 58 with amplitude peaks that match those of a normalized acceleration for circular motion. To detect acceleration and rotational orientation of the crankshaft 58, a sensor assembly 62 may be installed on the pumping unit 12 (for example, on or as part of a bearing housing or cap for a wrist pin 52, as depicted in FIG. 1).

The principles described below can be used to monitor vibration produced during operation of the pumping unit 12, for example, to detect any current or impending maintenance issues (such as, bearing failure, gear failure, etc.). For such diagnostic purposes, the sensor assembly 62 may be installed at any location, or attached to any component, on the pumping unit 12 (such as, on the gear reducer 42, near a wrist pin 52 or other bearing 38, 54, etc.).

Data output by the sensor assembly 62 can be communicated to other devices and systems using various different transmission techniques. Wireless communication (such as, radio frequency, WiFi or Bluetooth™) may be used to transmit the data to an operator's portable device (e.g., a laptop computer, tablet or smartphone, etc.) or to a local pumping unit controller 64 (such as, the WellPilot™ pumping unit controller marketed by Weatherford International, Inc. of Houston, Texas USA). However, it should be understood that any form of transmission or communication (including, for example, wired, Internet, satellite, etc.) may be used to transmit data from the sensor assembly 62 to any local or remote location, in keeping with the principles of this disclosure.

Figure 2:
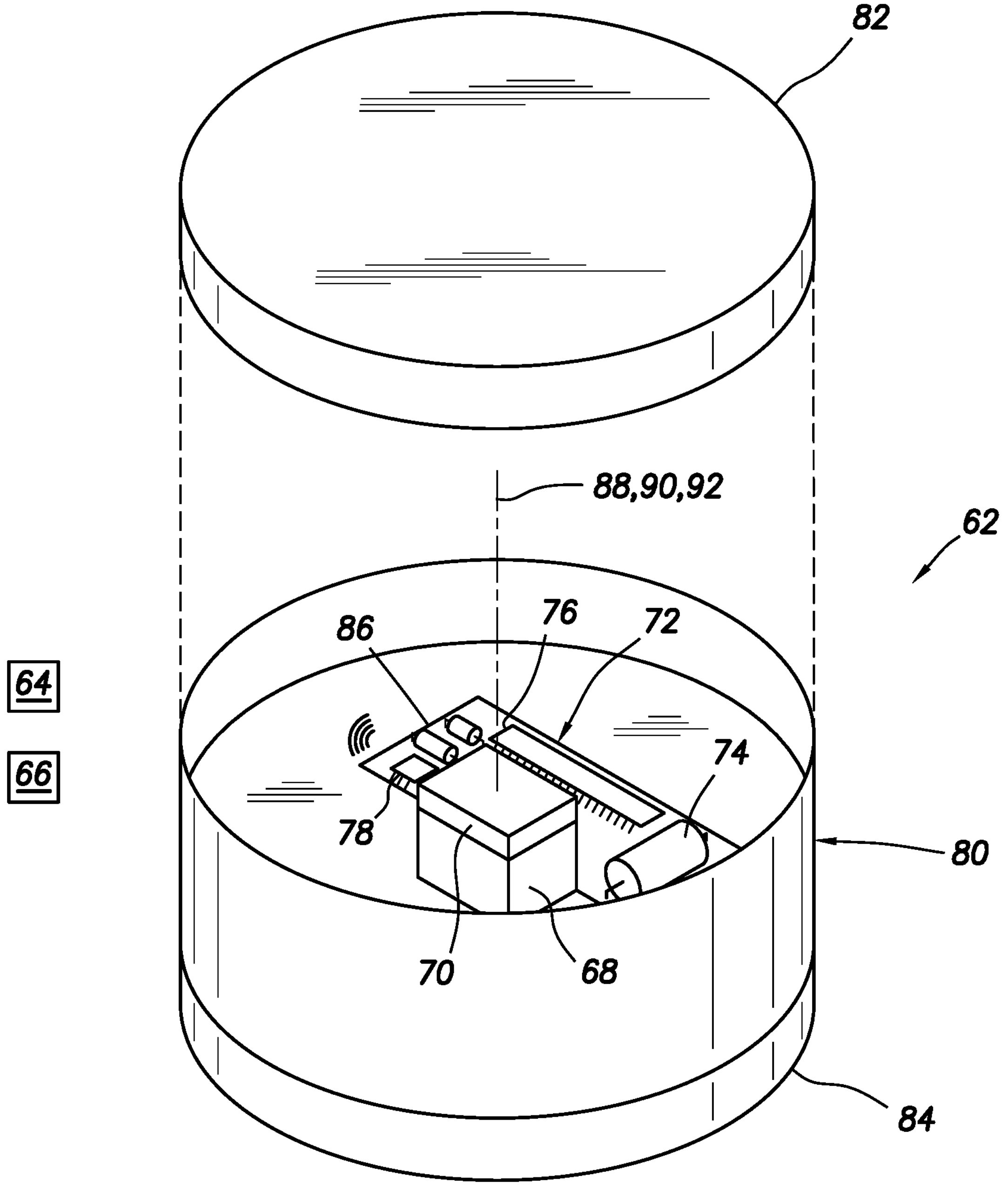
FIG. 2 is a representative partially exploded perspective view of an example of a sensor assembly which can embody the principles of this disclosure.

Referring additionally now to FIG. 2, a partially exploded view of an example of the sensor assembly 62 is representatively illustrated. In this example, the sensor assembly 62 is configured for separate attachment to a pumping unit (such as the FIG. 1 pumping unit 12), but in other examples the sensor assembly could be configured as an integral component of the pumping unit. For convenience and clarity, the sensor assembly 62 is described below as it may be used with the FIG. 1 system 10, method and pumping unit 12, but the sensor assembly may alternatively be used with other systems, methods and pumping units in keeping with the principles of this disclosure.

In the FIG. 2 example, the sensor assembly 62 includes a gyroscope 68, an accelerometer 70 and an electronics package 72. At least a battery 74, a processor 76 and a transceiver 78 are mounted to a circuit board 86 in this example of the electronics package 72. In other examples, the electronics package 72 can include other components, different combinations of components, or more or less components. The electronics package 72 could include the gyroscope 68 and the accelerometer 70 in some examples. Thus, the scope of this disclosure is not limited to any particular configuration, arrangement or functionality of the electronics package 72.

The gyroscope 68 in this example is a sensor configured to measure a rate of rotation about at least one gyroscope axis 88. In some examples, the gyroscope 68 may have the capability of measuring rates of rotation about at least three orthogonal axes. The gyroscope 68 may be in the form of a microelectromechanical systems (MEMS) inertial measurement unit (IMU) gyroscope, a Coriolis vibratory gyroscope (CVG), a piezoelectric gyroscope or a fiber optic gyroscope, suitable for incorporation into the electronics package 72. However, the scope of this disclosure is not limited to use of any particular type of gyroscope.

The accelerometer 70 in this example is a sensor configured to measure acceleration along at least one accelerometer axis 90. In some examples, the accelerometer 70 may have the capability of measuring acceleration along at least three orthogonal axes. The accelerometer 70 may be configured so that it can be incorporated into the electronics package 72. However, the scope of this disclosure is not limited to use of any particular type of accelerometer.

Note that the gyroscope and accelerometer axes 88, 90 are collinear in the FIG. 2 example. However, it is not necessary for the axes 88, 90 to be collinear in keeping with the principles of this disclosure. In other examples, the axes 88, 90 may not be collinear.

In some examples, the gyroscope 68 and the accelerometer 70 may be integrated into a single sensor package. A suitable integrated sensor package is marketed by Analog Devices, Inc. of Norwood, Massachusetts USA. However, the scope of this disclosure is not limited to use of an integrated sensor package.

The battery 74 supplies electrical power for operation of the electronics package 72. The battery 74 may be replaceable or rechargeable. The scope of this disclosure is not limited to any particular purpose for the battery, or to use of a battery at all.

The processor 76 in this example receives data output by the gyroscope 68 and the accelerometer 70. The processor 76 may include volatile and/or non-volatile memory for storing the data, or separate memory may be utilized for this purpose.

The memory may also store instructions or programming for conditioning, manipulating and outputting the data in response to operator commands. For example, a routine for performing a Fast Fourier Transform (FFT) of the time-based data to the frequency domain may be programmed in the memory, and/or a routine for outputting the data (in time-based or frequency-based form) for transmission by the transceiver 78 may be programmed in the memory. In some examples, the data manipulation capabilities (such as, an FFT conversion capability) may be integrated into a sensor package including both the gyroscope 68 and the accelerometer 70.

The transceiver 78 is a wireless transceiver in the FIG. 2 example. Wireless transmission or reception by the transceiver 78 may be of any type including, for example, radio frequency, WiFi, Bluetooth™, optical, inductive, etc. The scope of this disclosure is not limited to any particular form of wireless communication or telemetry.

As depicted in FIG. 2, the transceiver 78 can communicate with the pumping unit controller 64 or a computing device 66. In some examples, the computing device 66 can be a portable computing device (such as, a laptop computer, a tablet or a smartphone, etc.) transported to a pumping unit location by an operator specifically for the purpose of communicating with and receiving data output by the sensor assembly 62. In other examples, the computing device 66 could be at a remote location, and could be in communication with the sensor assembly 62 via the Internet, satellite transmission, or other form of communication.

The communication between the transceiver 78 and the computing device 66 can be two-way. In the FIG. 2 example, the transceiver 78 can transmit data to the computing device 66, and the computing device can transmit data and instructions, such as operational commands, to the transceiver for processing by the processor 76.

Preferably, the wireless transceiver 78 can communicate with the computing device 66 in real time while the pumping unit 12 is in operation, and while the gyroscope 68 and accelerometer 70 are outputting data indicative of the pumping unit operation. In this manner, immediate analysis of the data is enabled. However, the data may be recorded and stored for later analysis, if desired.

The housing assembly 80 as depicted in FIG. 2 contains the gyroscope 68, the accelerometer 70 and the electronics package 72. The housing assembly 80 includes a removable cap 82 for convenient access to the components therein, and a pumping unit interface 84 for attaching the sensor assembly 62 to a pumping unit.

In some examples, the housing assembly 80 may include inner and outer housings, with the inner housing configured to contain the gyroscope 68, the accelerometer 70 and the electronics package 72, and to isolate these components from environmental dust, water, etc. The outer housing may be configured to shield the inner housing and components therein from solar radiation, physical impacts, etc. However, the scope of this disclosure is not limited to any particular type or configuration of the housing assembly 80.

The pumping unit interface 84 securely attaches or mounts the sensor assembly to a pumping unit. In the FIG. 1 example, the pumping unit interface 84 enables the sensor assembly 62 to be mounted at the wrist pin 52 location, in a manner that aligns an axis of rotation 92 of the wrist pin and the sensor assembly 62 with the gyroscope and accelerometer axes 88, 90.

However, it is not necessary for the axis of rotation 92 to be collinear with the gyroscope and accelerometer axes 88, 90 in keeping with the principles of this disclosure. In examples in which the gyroscope and accelerometer axes 88, 90 are not collinear with the axis of rotation 92, note that the gyroscope 68 and accelerometer 70 can still have the same position (e.g., radius) relative to the axis of rotation 92 during operation of the pumping unit 12.

In other examples, the pumping unit interface 84 may enable the sensor assembly 62 to be attached or mounted in other locations on a pumping unit. For example, the sensor assembly 62 could be attached to the gear reducer 42, the prime mover 44, the beam 34 or another component of the FIG. 1 pumping unit 12.

For attachment of the sensor assembly 62 at the wrist pin 52 location, the pumping unit interface 84 can comprise a flange or other permanent or semi-permanent attachment (for example, comprising fasteners, threading, etc.). The sensor assembly 62 could thereby form a cap or bearing housing for the wrist pin 52 bearings in some examples. In this manner, the sensor assembly 62 can remain attached to the pumping unit 12 for a relatively long term. Such permanent or semi-permanent attachment using the pumping unit interface 84 may alternatively be used to attach the sensor assembly 62 to other components of the pumping unit 12 (such as, the gear reducer 42, the prime mover 44, the beam 34, etc.).

In other examples, it may be desired to temporarily attach the sensor assembly 62 to the pumping unit 12. In these cases, the pumping unit interface 84 can comprise a magnet device (such as, one or more permanent magnets or electromagnets, a magnetostrictive device, etc.). In this manner, the sensor assembly 84 can be temporarily attached to any ferrous component of the pumping unit 12.

In the FIG. 1 system 10, the sensor assembly 62 may be used in a method of balancing the pumping unit 12, and/or the sensor assembly may be used in a method of inspecting the pumping unit (for example, in order to detect current or impending component wear or failure). However, the scope of this disclosure is not limited to any particular purpose or purposes for which the sensor assembly 62 is utilized.

Figure 3:
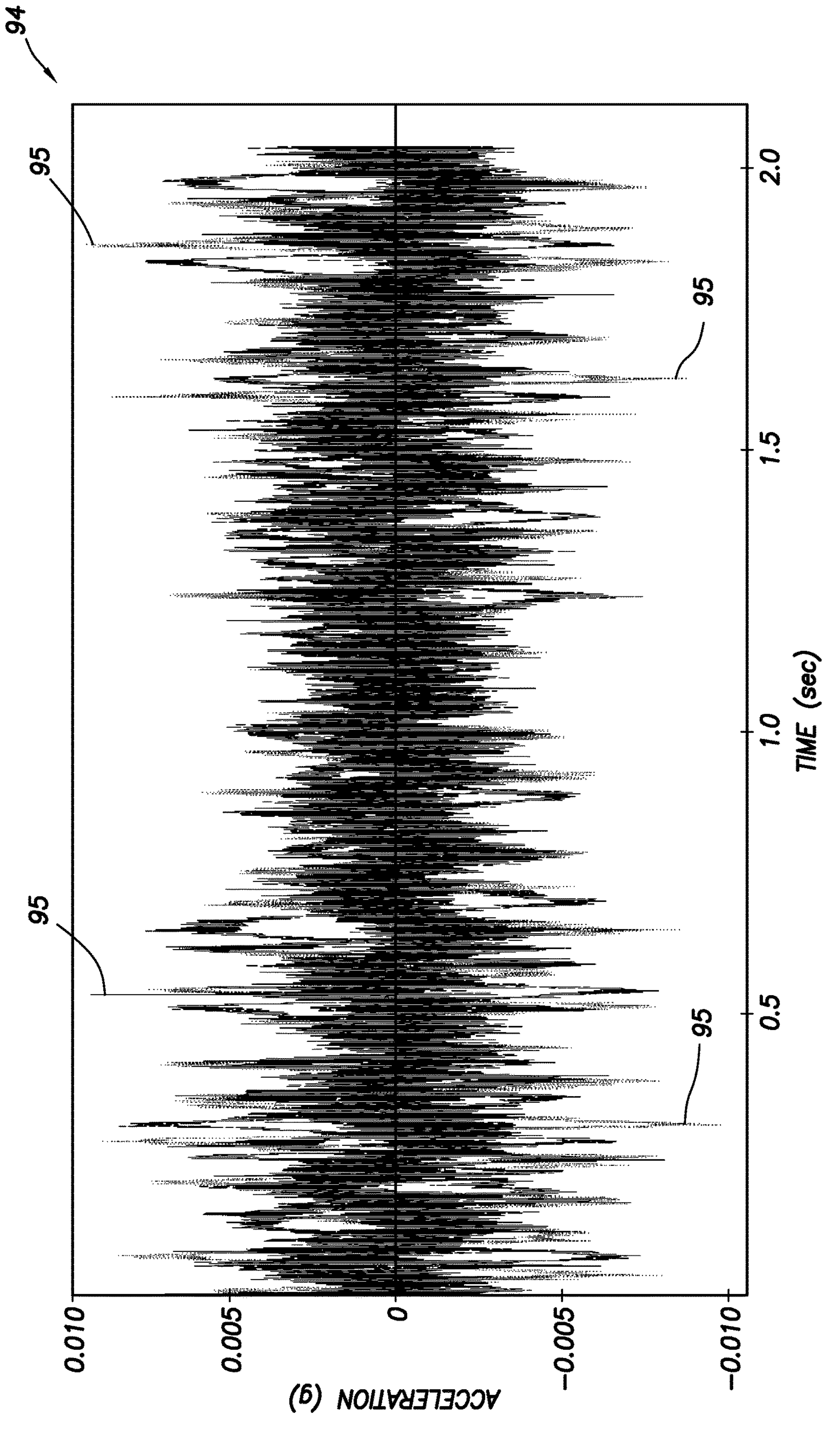
FIG. 3 is a representative graph of an example of acceleration versus time data output by the sensor assembly.

Referring additionally now to FIG. 3, a graph 94 of an example of acceleration versus time data output by the sensor assembly 62 is representatively illustrated. The data is indicative of operation of the pumping unit 12 after the sensor assembly 62 has been attached to the pumping unit. In this example, acceleration in each of three orthogonal axes as detected by the accelerometer 70 over a time period of two seconds has been recorded.

In the time period depicted in FIG. 3, the graph 94 includes a number of acceleration amplitude peaks 95. If one or more of the amplitude peaks 95 exceeds a predetermined threshold (such as 0.007 g in the FIG. 3 example), this may be an indication of current or impending component wear or failure. In such a case, the method of inspecting the pumping unit 12 includes transforming the time-based acceleration data to frequency-based acceleration data. The FFT capabilities mentioned above may be used for converting the acceleration versus time data to acceleration versus frequency data for further evaluation.

Figure 4:
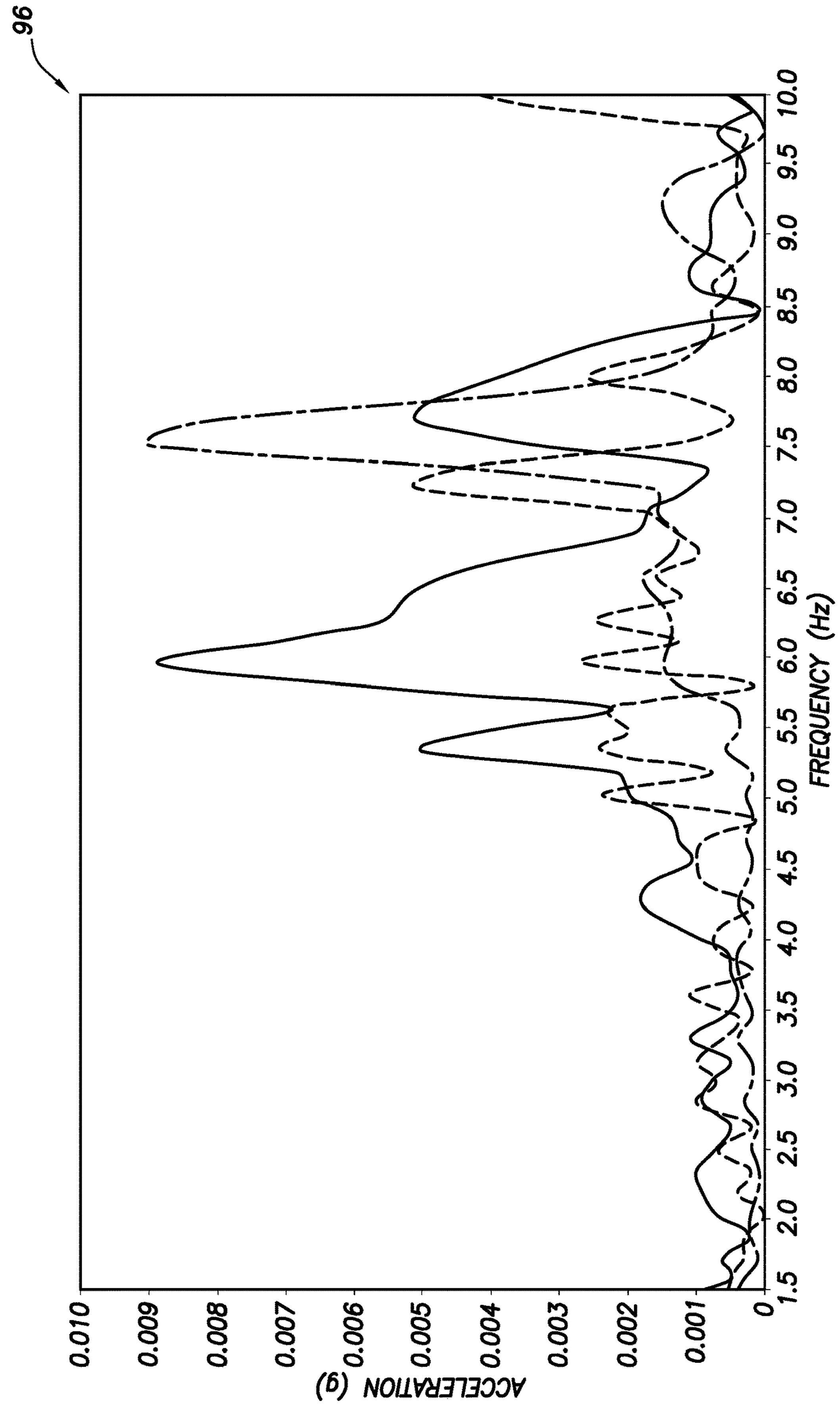
FIG. 4 is a representative graph of an example of acceleration versus frequency data output by the sensor assembly.

Referring additionally now to FIG. 4, a graph 96 of an example of acceleration versus frequency data output by the sensor assembly 62 is representatively illustrated. The FIG. 4 graph 96 comprises the acceleration versus time data of FIG. 3 converted to acceleration versus frequency data.

In this example, a frequency range of interest from 1.5 to 10 Hz is depicted. It is expected that current or impending failure of wrist pin bearings will be indicated by acceleration amplitude peaks in this frequency range of interest. If it is desired to inspect for current or impending wear or damage to other components, respective different frequency ranges of interest may be selected for evaluation. For example, it is expected that current or impending failure of a gear reducer will be indicated by acceleration amplitude peaks at greater than 40 Hz.

One way of isolating a frequency range of interest (or at least excluding data outside the frequency range of interest) for evaluation is by appropriately selecting a sampling rate of the sensor assembly 62. For example, if a sampling rate of 80 Hz is chosen, then acceleration at frequencies greater than 80 Hz will be substantially excluded from the data received and recorded by the processor 76 in the FIG. 2 sensor assembly 62. Other techniques, such as use of filters, may be used to select a desired frequency range of interest for further evaluation.

Figure 5:
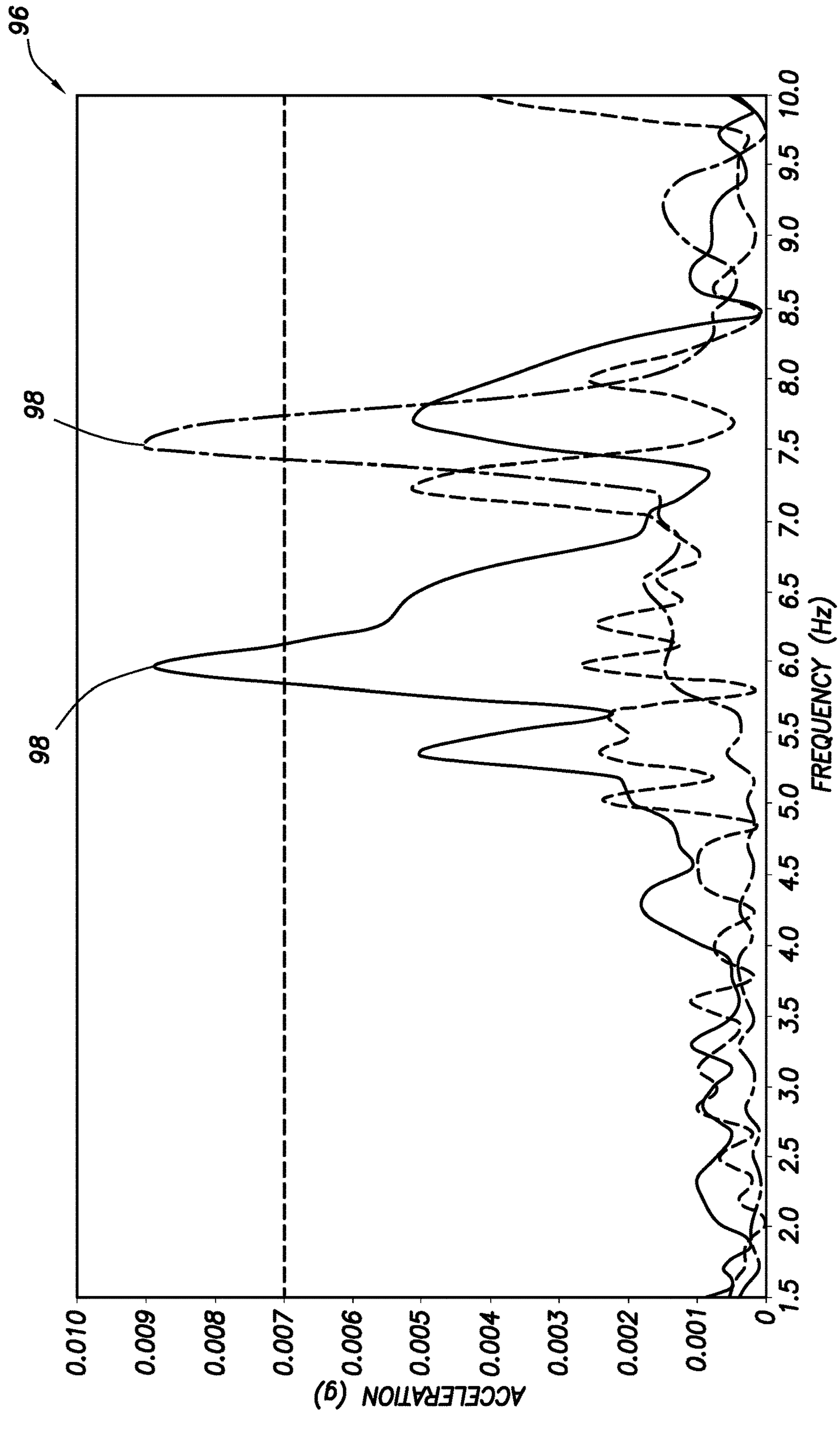
FIG. 5 is a representative graph of the FIG. 4 example with a predetermined amplitude threshold indicated thereon.

Referring additionally now to FIG. 5, a representative graph of the FIG. 4 acceleration versus frequency data is representatively illustrated, with a predetermined acceleration amplitude threshold of 0.007 g indicated thereon. In other examples, the threshold may be at a different amplitude. In addition, it is not necessary for the threshold selected for use in this stage of the method (after data transformation to the frequency domain) to be the same as the threshold selected for use in an earlier stage of the method (as in FIG. 3, prior to transformation of the data to the frequency domain).

Note that, in the FIG. 5 example, there are two acceleration amplitude peaks 98 that exceed the threshold of 0.007 g. The number of the peaks 98 that exceed the threshold in the selected frequency range can provide useful information for diagnosing whether current or future wear or damage is indicated. For example, a relatively small number of the peaks 98 can indicate minimal or acceptable wear, but a relatively large number of the peaks can indicate unacceptable wear or damage.

It can also be useful to evaluate how the number of the peaks 98 varies over time. As mentioned above, the data depicted in FIGS. 3-5 were measured over a two second time period. If, at a subsequent time (perhaps many hours or days later) another two second period of acceleration measurements reveals that the number of the peaks 98 for the subsequent measurements has increased, this can be an indication that wear or damage is increasing. If multiple subsequent measurements reveal that the number of the peaks 98 is accelerating, this can be an indication that failure is imminent. If subsequent measurements reveal that the number of the peaks 98 is not increasing or accelerating over time, this can be an indication that wear or damage is not progressing, and perhaps maintenance (such as expensive replacement of bearings or gears) can be deferred.

Figure 6:
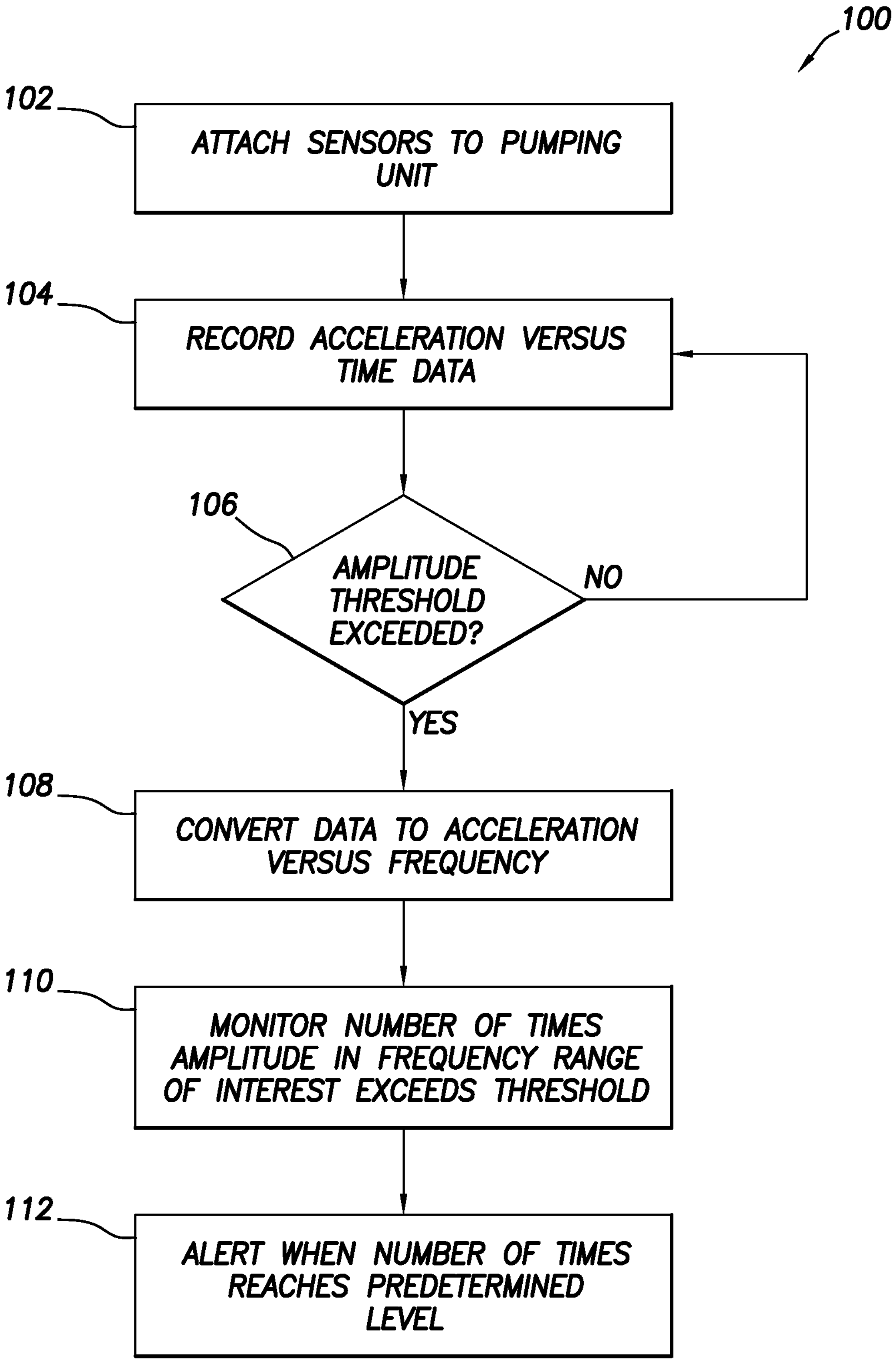
FIG. 6 is a representative flowchart for an example method of inspecting a well pumping unit.

Referring additionally now to FIG. 6, a flowchart for an example of a method 100 of inspecting a well pumping unit is representatively illustrated. For convenience and clarity, the method 100 is described below as it may be practiced using the pumping unit 12, sensor assembly 62 and data of FIGS. 3-5, but it should be clearly understood that the scope of this disclosure is not limited to use of the method with any particular pumping unit, sensor assembly or data.

In an initial step 102, one or more sensors are attached to the pumping unit 12. For example, the FIG. 2 sensor assembly 62 may be permanently, semi-permanently or temporarily attached to the FIG. 1 pumping unit 12 at any location. If it is desired to monitor or investigate a condition of a particular component, then preferably the sensor assembly 62 is attached on, at or near the particular component for most effective coupling of vibration between the component and the sensor assembly.

In step 104, acceleration versus time data is recorded. In the FIGS. 3-5 example described above, the time-based (time domain) data is recorded over a two second time period. Other time periods can be selected in other examples. If it is desired to monitor the health or condition of the pumping unit 12 (or a particular component thereof) over time, then the data may be recorded for multiple time periods.

In step 106, a determination is made whether a preselected acceleration amplitude threshold is exceeded in the time-based data. In the FIG. 3 example described above, an amplitude threshold of 0.007 g (absolute value) is exceeded at multiple amplitude peaks 95, and so a need for further evaluation is indicated (designated as "YES" in FIG. 6). If the preselected acceleration amplitude threshold is not exceeded (designated as "NO" in FIG. 6), then further data may be recorded at a subsequent time, or alternatively the method 100 could end at that point.

In step 108, the acceleration versus time data is converted or transformed to acceleration versus frequency data. As described above, this conversion could be performed using an FFT capability of the sensor assembly 62. Alternatively, the conversion could be performed by the pumping unit controller 64, the computing device 66 or another element having a suitable time domain to frequency domain conversion capability.

In step 110, a number of times that the acceleration amplitude exceeds a predetermined threshold in a certain frequency range of interest is determined. The frequency range of interest can be selected to correspond with a wear, damage or failure mode of a particular component (such as, a bearing, a gear, etc.). The number can indicate to an operator whether there is current or impending wear or damage. A change in the number over time can indicate whether the wear or damage is increasing or remaining substantially the same, or whether failure is imminent.

In step 112, an alert can optionally be provided if the number of times that the acceleration amplitude exceeds the predetermined threshold in the frequency range of interest reaches a predetermined level. The alert could be in the form of a message, a visual indication, a sound, a vibration, or of another type selected to obtain the attention of an operator. The alert could be generated by the pumping unit controller 64, the computing device 66 or another element.

Figure 7:
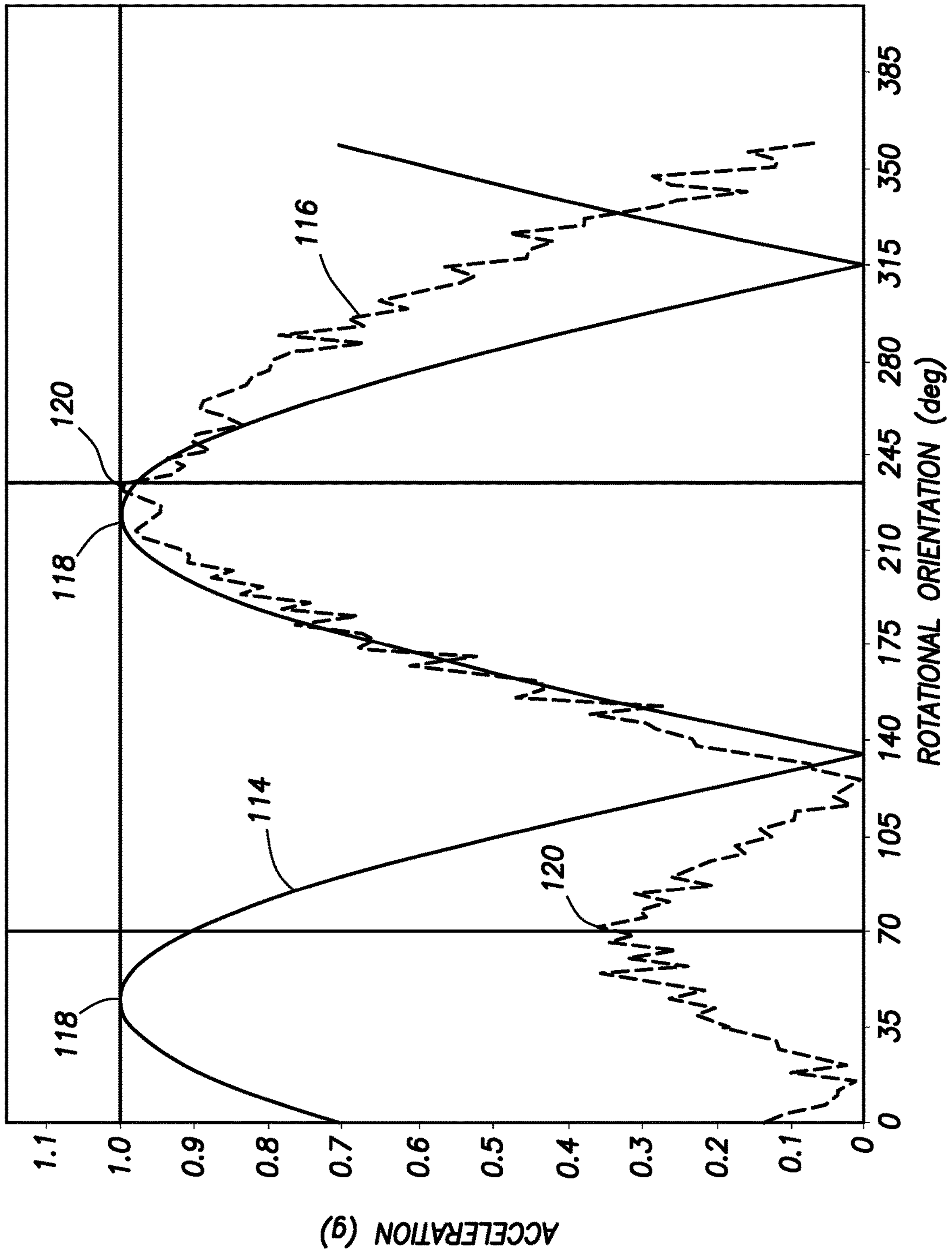
FIG. 7 is a representative graph of an example of acceleration versus rotational orientation data output by the sensor assembly.

Referring additionally now to FIG. 7, a graph of an example of acceleration versus rotational orientation data is representatively illustrated. In this example, the data was recorded using the FIG. 2 sensor assembly 62 attached to the FIG. 1 pumping unit 12 at an outer end of the crank arm 40, but the scope of this disclosure is not limited to data generated using any particular sensor assembly attached to any particular component of any particular pumping unit (for example, the sensor assembly 62 can be attached at the wrist pin 52 as depicted in FIG. 1).

Two curves 114, 116 are depicted in FIG. 7. The curve 114 is a normalized acceleration versus rotational orientation curve for circular motion of the crank arm 40 (see FIG. 1). Note that the maximum acceleration amplitude indicated by the curve 114 has a normalized value of one, and the acceleration is depicted for a full 360 degrees of rotation of the crank arm 40. There are two acceleration peaks 118 (at approximately 40 and 220 degrees in this example) spaced 180 degrees apart.

The curve 116 results from measurement of the acceleration (for example, using the accelerometer 70 of the sensor assembly 62) correlated with measurement of the rotational orientation (for example, using the gyroscope 68 of the sensor assembly 62) while the pumping unit 12 is operating.

The curve 116 is normalized. Note that there are two general peaks 120 (at approximately 70 and 236 degrees in this example).

Thus, the curve 116 does not quite align with the "idealized" curve 114 for circular motion of the crank arm 40. Instead, the peaks 118, 120 are offset from one another, indicating an undesirable imbalance in the pumping unit 12 (e.g., due to the counterweights 56 incompletely balancing the load applied to the horse head 32 end of the beam 34).

To reduce, minimize or eliminate this offset or difference between the peaks 118, 120, the positions of the counterweights 56 along the crank arms 40 can be adjusted. For example, if the pumping unit 12 is "rod heavy," one or more of the counterweights 56 can be moved outward (away from the crankshaft 58) along the crank arms 40. If the pumping unit 12 is "weight heavy," one or more of the counterweights 56 can be moved inward (toward the crankshaft 58) along the crank arms 40.

In the FIG. 7 example, the peaks 120 "lag" the peaks 118 (occur at greater rotational displacement). This is an indication that the pumping unit 12 is "rod heavy" and the counterweights 56 should be moved away from the center of rotation (the crankshaft 58). If instead the peaks 118 lag the peaks 120 in another example, that would be an indication that the pumping unit 12 is "weight heavy" and the counterweights 56 should be moved toward the center of rotation.

After any adjustment of the counterweights 56, the measurement of acceleration versus rotational orientation data can be repeated during a subsequent operation of the pumping unit 12, in order to confirm that the pumping unit is balanced (or at least more completely balanced as compared to the previous measurement). If an unacceptable offset or difference between the peaks 118, 120 remains, the position of one or more counterweights 56 can again be adjusted, and then the measurement can be repeated for another subsequent operation of the pumping unit 12.

Figure 8:
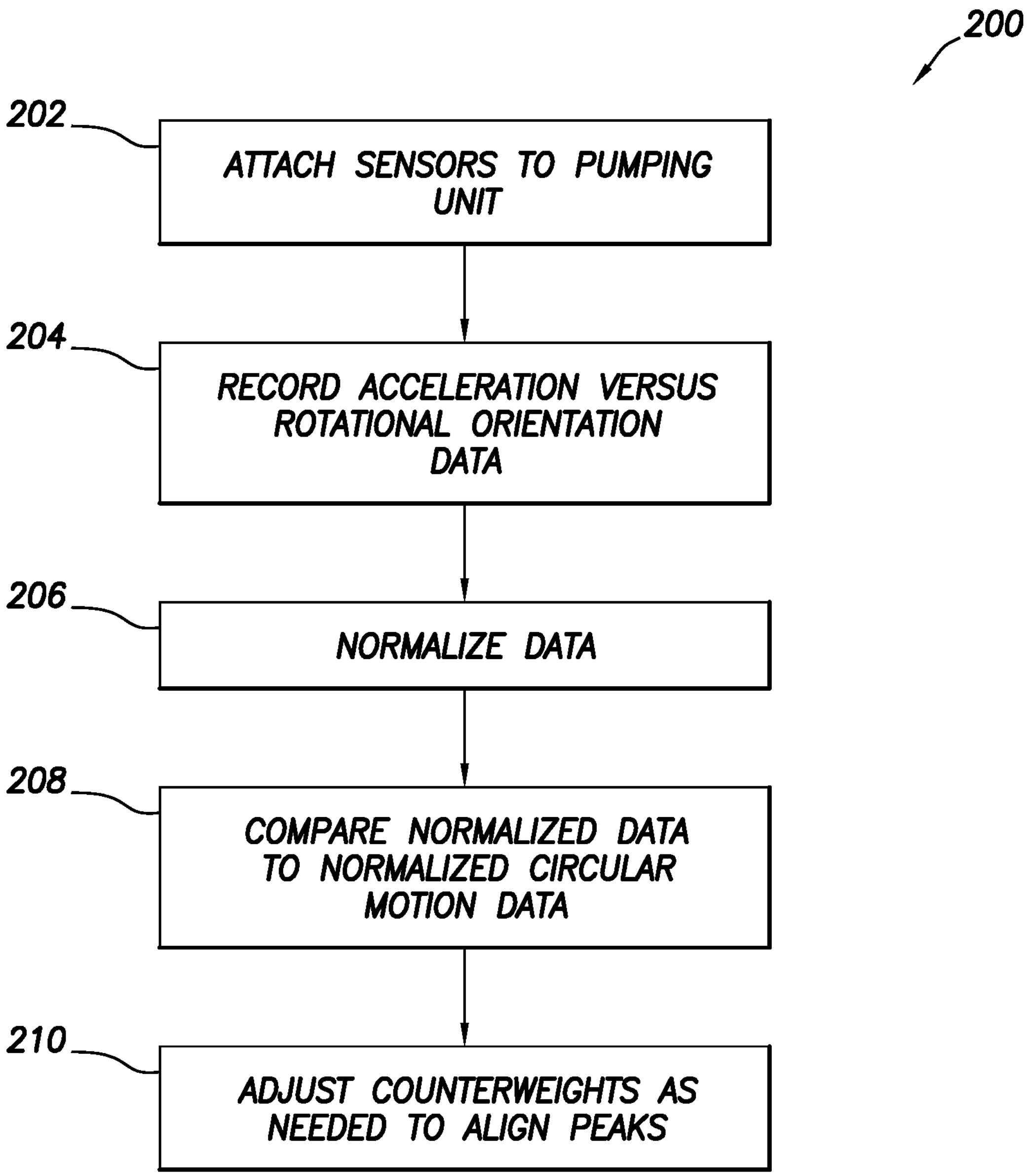
FIG. 8 is a representative flowchart for an example method of balancing a well pumping unit.

Referring additionally now to FIG. 8, a flowchart for an example of a method 200 of balancing a well pumping unit is representatively illustrated. For convenience and clarity, the method 200 is described below as it may be practiced using the pumping unit 12, sensor assembly 62 and data of FIG. 7, but it should be clearly understood that the scope of this disclosure is not limited to use of the method with any particular pumping unit, sensor assembly or data.

In an initial step 202, one or more sensors are attached to the pumping unit. For example, the FIG. 2 sensor assembly 62 may be permanently, semi-permanently or temporarily attached to the FIG. 1 pumping unit 12 at the wrist pin 52 location, at an outer end of a crank arm 40, or at another location.

In step 204, acceleration versus rotational orientation data is recorded while the pumping unit 12 is operating. In the FIG. 7 example, the data is recorded for at least one full rotation of the crank arm 40.

In step 206, the acceleration versus rotational orientation data is normalized. After normalization, a maximum acceleration amplitude in the data is one. Note that normalization is performed for convenience in later evaluation of any differences between the peaks 120 in the data and the peaks 118 for acceleration due to circular motion of the crank arm 40 (see step 208), but normalization is not necessary for such evaluation in keeping with the principles of this disclosure.

In step 208, the curve 116 for the measured acceleration versus rotational orientation data is compared to the curve 114 for acceleration due to circular motion of the crank arm 40. As mentioned above, normalization of the curves 114, 116 may be desirable for convenience in comparing the curves, but the comparison can be performed without such normalization. The comparison performed in step 208 can comprise determining a difference between the rotational orientations at which respective acceleration peaks 118, 120 of the curves 114, 116 occur.

In step 210, if there is an unacceptable difference between the rotational orientations of the respective peaks 118, 120 (or it is merely desired to reduce or eliminate the difference), one or more of the counterweights 56 can be repositioned on the crank arms 40. In this manner, the peaks 120 of the measured data curve 116 can be shifted, so that they more closely align with the peaks 118 of the curve 114 for subsequent data measurements.

It may now be fully appreciated that the above disclosure provides significant advancements to the arts of configuring beam pumping units for efficient operation and maintaining such efficient operation. In examples described above, the sensor assembly 62 is configured for effective measurements of pumping unit parameters (such as, acceleration and rotational orientation), the method 100 of inspecting a pumping unit provides for enhanced monitoring conditions of specific pumping unit components, and the method 200 of balancing a pumping unit provides for ready evaluation of the state of balance of the pumping unit and whether the counterweights 56 should be repositioned to achieve a more complete state of balance.

The above disclosure provides to the arts a sensor assembly 62 for use with a well pumping unit 12. In one example, the sensor assembly 62 can comprise: a gyroscope 68 configured to detect a rate of rotation about at least one gyroscope axis 88; an accelerometer 70 configured to detect acceleration along at least one accelerometer axis 90; and a housing assembly 80 containing the gyroscope 68 and the accelerometer 70, the housing assembly 80 including a pumping unit interface 84 configured to attach the housing assembly 80 to the pumping unit 12. The gyroscope axis 88 is preferably collinear with the accelerometer axis 90.

In any of the examples described herein:

The sensor assembly 62 may include at least one processor 76 disposed in the housing assembly 80, the processor 76 being configured to perform a Fast Fourier Transformation on data output by at least one of the gyroscope 68 and the accelerometer 70. The processor 76 may be configured to transform time-based data output by at least one of the gyroscope 68 and the accelerometer 70 to frequency-based data.

The pumping unit interface 84 may comprise a magnet device or a mechanical attachment.

The gyroscope 68 and the accelerometer 70 may have a same rotational axis 92.

The sensor assembly 62 may include a wireless transceiver 78 disposed in the housing assembly 80. The wireless transceiver 78 may communicate with a controller 64 of the pumping unit 12.

In a system 10 comprising the sensor assembly 62, the wireless transceiver 78 may communicate with a computing device 66 external to the housing assembly 80. The wireless transceiver 78 may communicate with the computing device 66 in real time while the pumping unit 12 is in operation.

A method 200 of balancing a well pumping unit 12 is also provided to the art by the above disclosure. In one example, the method 200 comprises: attaching a sensor assembly 62 to the pumping unit 12; recording acceleration versus rotational orientation data while the pumping unit 12 is in operation; comparing peaks 120 of the acceleration versus rotational orientation data to peaks 118 of acceleration due to circular motion; and adjusting a position of a counterweight 56 on a crank arm 40 of the pumping unit 12, thereby reducing a difference between the peaks 118 of the acceleration due to circular motion and the peaks 120 of the acceleration versus rotational orientation data for subsequent operation of the pumping unit 12.

In any of the examples described herein:

The method 200 may include, prior to the comparing step 208, normalizing the acceleration versus rotational orientation data. The comparing step 208 may include comparing peaks 120 of the normalized acceleration versus rotational orientation data to peaks 118 of the acceleration due to circular motion normalized. The reducing step may include reducing the difference between the peaks 118 of normalized acceleration due to circular motion and the peaks 120 of the normalized acceleration versus rotational orientation data for the subsequent operation of the pumping unit 12.

The recording step 204 may include receiving data output by a gyroscope 68 and an accelerometer 70 of the sensor assembly 62.

The attaching step 202 may include the gyroscope 68 and the accelerometer 70 having a same axis of rotation 92 while the pumping unit 12 is in operation.

The attaching step 202 may include temporarily attaching the sensor assembly 62 with a magnet device (e.g., as the pumping unit interface 84) to the pumping unit 122.

The adjusting step 210 may include aligning the peaks 118 of the acceleration due to circular motion with the peaks 120 of the acceleration versus rotational orientation data for subsequent operation of the pumping unit 12.

Also described above is a method 100 of inspecting a well pumping unit 12. In one example, the method 100 comprises: attaching a sensor assembly 62 to the pumping unit 12, the sensor assembly 62 including an accelerometer 70; recording acceleration versus time data output by the sensor assembly 62; and in response to an amplitude of the acceleration versus time data exceeding a first predetermined threshold, transforming the acceleration versus time data to acceleration versus frequency data.

In any of the examples described herein:

The method may include monitoring a number of times an amplitude of the acceleration versus frequency data exceeds a second predetermined threshold; and producing an alert when the number reaches a predetermined level.

The producing step 112 may include producing the alert when the number reaches the predetermined level in a predetermined time period. The producing step 112 may include producing the alert when a rate of the number reaching the predetermined level per predetermined time period increases.

The monitoring step 110 may include monitoring the number of times the amplitude of the acceleration versus frequency data exceeds the second predetermined threshold in a predetermined range of frequencies.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A sensor assembly for use with a well pumping unit, the sensor assembly comprising:

a gyroscope configured to detect a rate of rotation about at least one gyroscope axis;

an accelerometer configured to detect acceleration along at least one accelerometer axis; and a housing assembly containing the gyroscope and the accelerometer, the housing assembly including a pumping unit interface configured to attach the housing assembly to the pumping unit, in which the at least one gyroscope axis is collinear with the at least one accelerometer axis.

2. The sensor assembly of claim 1, further comprising at least one processor disposed in the housing assembly, the processor being configured to perform a Fast Fourier Transformation on data output by at least one of the gyroscope and the accelerometer.

3. The sensor assembly of claim 1, further comprising at least one processor disposed in the housing assembly, the processor being configured to transform time-based data output by at least one of the gyroscope and the accelerometer to frequency-based data.

4. The sensor assembly of claim 1, in which the pumping unit interface comprises a magnet device.

5. The sensor assembly of claim 1, in which the pumping unit interface comprises a mechanical attachment.

6. The sensor assembly of claim 1, in which the gyroscope and the accelerometer have a same rotational axis.

7. The sensor assembly of claim 1, further comprising a wireless transceiver disposed in the housing assembly.

8. A system comprising the sensor assembly of claim 7, in which the wireless transceiver communicates with a controller of the pumping unit.

9. A system comprising the sensor assembly of claim 7, in which the wireless transceiver communicates with a computing device external to the housing assembly.

10. The system of claim 9, in which the wireless transceiver communicates with the computing device in real time while the pumping unit is in operation.

* * * * *